(12) United States Patent
Lefaudeux et al.

(10) Patent No.: US 10,415,784 B2
(45) Date of Patent: Sep. 17, 2019

(54) LIGHTING MODULE WITH CHROMATISM CORRECTION

(71) Applicant: VALEO VISION, Bobigny (FR)

(72) Inventors: Nicolas Lefaudeux, Bobigny (FR); Guillaume Thin, Bobigny (FR); Antoine De Lamberterie, Bobigny (FR); Samira Mbata, Bobigny (FR); Francois-Xavier Amiel, Bobigny (FR); Vincent Dubois, Bobigny (FR); Van-Thai Hoang, Bobigny (FR); Thomas Canonne, Bobigny (FR)

(73) Assignee: VALEO VISION, Bobigny (FR)

( * ) Notice: Subject to any disclaimer, the term of this patent is extended or adjusted under 35 U.S.C. 154(b) by 0 days.

(21) Appl. No.: 15/927,382

(22) Filed: Mar. 21, 2018

(65) Prior Publication Data

US 2018/0274744 A1 Sep. 27, 2018

(30) Foreign Application Priority Data

Mar. 21, 2017 (FR) ...................................... 17 52313

(51) Int. Cl.
| | |
|---|---|
| *F21S 41/275* | (2018.01) |
| *F21S 41/143* | (2018.01) |
| *F21S 41/26* | (2018.01) |
| *F21S 41/147* | (2018.01) |
| *F21S 41/255* | (2018.01) |
| *B60Q 1/14* | (2006.01) |

(52) U.S. Cl.
CPC .......... *F21S 41/275* (2018.01); *B60Q 1/1423* (2013.01); *F21S 41/143* (2018.01); *F21S 41/147* (2018.01); *F21S 41/255* (2018.01); *F21S 41/26* (2018.01)

(58) Field of Classification Search
CPC ...... F21S 41/275; F21S 41/147; F21S 41/255; F21S 41/26; F21S 41/143; B60Q 1/1423
See application file for complete search history.

(56) References Cited

U.S. PATENT DOCUMENTS

2005/0254254 A1    11/2005  Moseler et al.
2007/0230204 A1*  10/2007  Tatsukawa ............ F21S 41/143
                                                                362/539
(Continued)

FOREIGN PATENT DOCUMENTS

DE    10 2007 014 676 A1    10/2007
DE    10 2008 005 488 A1     7/2009
(Continued)

OTHER PUBLICATIONS

French Preliminary Search Report dated Nov. 13, 2017 in French Application 17 52313 filed on Mar. 21, 2017 (with English Translation of Categories of Cited Documents).

*Primary Examiner* — David V Bruce
(74) *Attorney, Agent, or Firm* — Oblon, McClelland, Maier & Neustadt, L.L.P.

(57) ABSTRACT

A lighting module for motor vehicles is provided. The lighting module comprises at least one lighting engine configured for forming a light beam with a cut-off line running along one or more axes, and at least one lens designed to project the light beam with a cut-off line. The lens comprises diffractive elements which correct all or part of the chromatism of the lens, and it comprises a central region which is lacking any diffractive elements.

20 Claims, 6 Drawing Sheets

(56) References Cited

U.S. PATENT DOCUMENTS

2008/0253141 A1    10/2008   Nakada et al.
2011/0011133 A1     1/2011   Moseler et al.

FOREIGN PATENT DOCUMENTS

| EP | 1 584 863 A2 | 10/2005 |
| EP | 1 637 797 A2 | 3/2006 |
| EP | 1 980 787 A1 | 10/2008 |
| JP | 2014-175198 | 9/2014 |

\* cited by examiner

LIGHTING MODULE WITH CHROMATISM CORRECTION

FIELD OF THE INVENTION

The invention relates to the field of lighting devices for motor vehicles, in other words front and rear lighting devices allowing a light beam to be projected for illuminating the road. Low-beam and/or high-beam headlamps are examples of such lighting devices. The invention relates more precisely to the lighting modules composing the lighting devices.

BACKGROUND

The projection of a light beam by a lighting device of a motor vehicle, such as the front headlamps or rear lights, conventionally allows the road to be illuminated with an overall illumination and thus the visibility in the dark to be improved, for example at night. This allows the vehicle to be driven safely. These lighting devices may comprise one or more lighting modules.

The regulations impose that the light beams projected by the lighting modules comprise a cut-off so as not to dazzle the other users. This cut-off, which takes the form of a "cut-off line", creates a transition region between a lit region and a dark region. The shape of the cut-off line is generally regulated, for example the regulation ECE n°48 in Europe or the regulation FMVSS 108 in the USA.

When a light beam with a cut-off line is projected by a conventional lighting module, a coloured effect is observed in the transition region. This observation results from the phenomenon of chromatic dispersion of light and of the dispersive nature of the optical components integrated into the lighting module. In practice, the main consequence of this phenomenon is that the lamps projecting a beam of white light appear blue for the other users; this phenomenon is called chromatism. Furthermore, this chromatism can be a nuisance for drivers.

One known solution is for example to use an achromatic system composed of concentric circular diffractive elements. These diffractive elements allow the chromatism of the cut-off line to be corrected in several directions. Nevertheless, this solution requires a significant quantity of diffractive elements, in other words a large part of the lens must thus be covered by these diffractive elements. Thus, a lighting module comprising a lens with such concentric circular diffractive elements exhibits a limited diffraction efficiency which results in a loss and scattering of the light from the light source. Moreover, the concentric diffractive elements make diffraction spots appear due to the other diffraction orders in the dark region: these spots are a nuisance, notably for the other users. Furthermore, the larger the number of diffractive elements, the more complex the system to be fabricated which increases its cost of production.

In this context, there exists a need to improve the projection of a light beam with a cut-off line and to facilitate the fabrication of the diffractive element.

SUMMARY OF THE INVENTION

For this purpose, a lighting module for motor vehicles is provided. The module comprises at least one lighting engine configured for forming a light beam with a cut-off line, the cut-off line running along one or more axes. The module furthermore comprises at least one lens designed to project the said light beam with a cut-off line, the said at least one lens comprising diffractive elements for correcting all or part of the chromatism of the lens, and comprising a central region which is lacking the said diffractive elements.

According to various examples, the lighting device may comprise one or more of the following features combined together:

- the central region extends on either side and along a projection of the said cut-off line onto the said at least one lens;
- the diffractive elements are positioned on at least one edge surrounding the said central region of the said at least one lens;
- the central region extends such that the chromatic dispersion angle of the light emitted by the lighting engine at the exit of the central region is less than or equal to half of an angle of the transition of the cut-off line;
- the angle of the transition of the cut-off line is in the range between 0.1° and 3° including boundaries, preferably between 0.25° and 0.3° including boundaries;
- the diffractive elements are substantially parallel to the cut-off line;
- the diffractive elements are arranged so as to form lines of diffractive elements, the lines of diffractive elements being substantially rectilinear and parallel to one another;
- the distances separating two successive lines of diffractive elements are identical;
- the distance between two successive lines of diffractive elements depends on the position of the two successive lines of diffractive elements with respect to the central region;
- the distance between two successive lines of diffractive elements is calculated as a function of the material and of the shape of the lens;
- the diffractive elements are positioned on an entry optical interface or an exit optical interface of the said at least one lens;
- the central region has a cylindrical optical power;
- a film comprises the diffractive elements and is placed onto the said at least one lens;
- the film is obtained by a lamination process;
- the said one or more light sources are electroluminescent sources.

A lighting device is also provided comprising at least one lighting module. The lighting device may execute a function chosen from amongst a low-beam function, a high-beam function, a fog beam function.

BRIEF DESCRIPTION OF THE FIGURES

Various embodiments of the invention will now be described, by way of non-limiting examples, with reference to the appended drawings in which.

DETAILED DESCRIPTION

A lighting module for motor vehicles is provided, together with a lighting device comprising one or more versions of such a lighting module. This lighting device projects a light beam onto a scene. The scene or "road scene" is the environment of the vehicle able to be illuminated by the lighting device. Such a lighting device is designed to execute the low-beam and/or high-beam and/or fog beam functions.

The lighting module according to the invention is adapted to motor vehicles which may be of any type of terrestrial vehicle, for example a motor car, a motorbike, or a lorry. The vehicle may be equipped with one or more headlamps and/or of one or more rear lamps. One or more of the headlamps and/or rear lamps may each comprise one or more lighting devices each configured for projecting a light beam.

Figure 1:
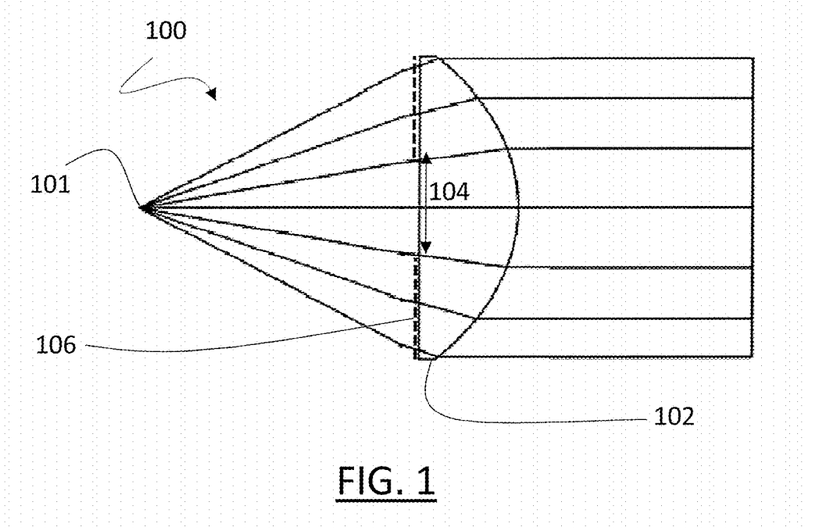
FIG. 1 illustrates a first example of a lighting module according to the invention.

FIG. 1 illustrates one example of a lighting module according to the invention. The lighting module 100 is composed of at least one lighting engine, of at least one lens 102, of several diffractive elements 106 positioned on the lens in such a manner that they allow a central region 104 to be left open which is lacking any diffractive elements.

The lighting module 100 comprises one or more light sources 101 which emit light rays, for example white light. The light sources may be light sources using a filament, a plasma, or else a gas. The light sources may also be electroluminescent sources or SSL ("solid-state lighting") which comprise electroluminescent elements. The electroluminescent elements are situated on one and the same substrate, and preferably on the same face of the substrate which may for example be made of sapphire or else silicon. The electroluminescent elements are deposited on or extend from at least one face of the substrate. An electroluminescent element may be, but is not limited to, a light-emitting diode LED, an organic light-emitting diode OLED or a polymer light-emitting diode PLED. Thus, it will be understood that any light source complying with any potential regulatory constraints in the automotive field and designed to emit light rays may be used.

The light source or sources included within the lighting module according to the invention are elements of a lighting engine. A lighting engine is a known device which forms a light beam with a cut-off line. It may thus comprise one or more light sources, a reflector and a beam folding element. The beam folding element allows a cut-off line to be formed which complies with the regulatory constraints, as known in the prior art. The reflector comprises one or more mirrors and allows the spatial distribution of the radiation from the light source or sources to be modified by reflection in such a manner as to create a light beam. Generally speaking, the lighting module according to the invention comprises at least one lighting engine.

The lighting module 100 also comprises one or more lenses 102. The one or more lenses form an optical system and they orient the light rays emitted by the lighting engine in such a manner as to obtain a light beam at the exit of the lighting module, e.g. a light beam for illuminating the scene in which a motor vehicle comprising the lighting module is being driven. A lens is a transparent medium limited by optical interfaces (for example an entry optical interface and an exit optical interface) which may for example be plane, convex, or concave. The term optical interface denotes the surfaces separating the medium of the lens, for example glass, from the medium within which the lens is situated, for example air. The term "entry optical interface" denotes the first optical interface of a lens encountered by the light rays which are to pass through this lens. By analogy, the "exit optical interface" denotes the last optical interface of a lens encountered by the light rays passing through this lens. As illustrated in FIG. 1, the lighting module preferably comprises at least one lens comprising a plane entry optical interface and a dished exit optical interface. It will be understood that the lens or lenses of the lighting module according to the invention are not limited to this example. Generally speaking, the lenses of the lighting module are known optical lenses, notably in the automotive field. One or more of these lenses comprise diffractive elements and the lenses which comprise diffractive elements have a central region which is lacking any diffractive elements.

Figure 3:
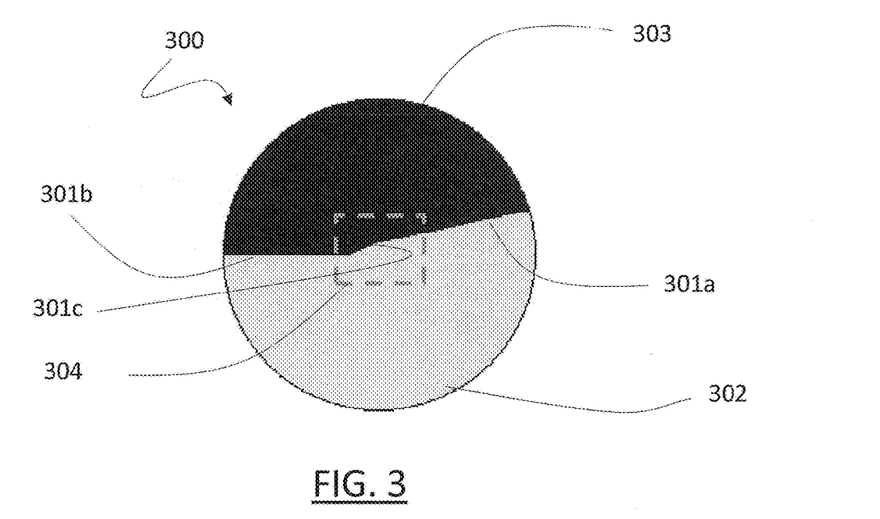
FIG. 3 illustrates one example of a projected image of a light beam with a cut-off line.

The lens or lenses of the lighting module are designed to project a light beam with a cut-off line onto the scene. One example of a projected image of a light beam with a cut-off line 300 is illustrated in FIG. 3. A light beam with a cut-off line comprises a "cut-off line" 301. Various means may be employed to form the cut-off line which is an image of these means. For example, the cut-off line may result from a mask positioned in front of the light source or sources of the module: in this case, the cut-off line is the image of the mask. In this example, it is the beam folding element of the lighting engine which limits the scattering of the light emitted by the light source or sources, also included within the lighting engine, into a given area of the scene. The cut-off line may also result, in the case of one or more pixelized light sources, from the extinction of certain pixels: in this case, the cut-off line is the image of the pattern formed by the lit pixels. The cut-off line marks a separation between an illuminated region 302, on the one hand, and a dark region 303, on the other. The use of a light beam with a cut-off line prevents another user or the driver, for example a vehicle coming from the opposite direction, from being dazzled. As illustrated in FIG. 3, the cut-off line may extend along one or more axes. According to the regulation, the cut-off line runs along two axes and takes the form of a broken line. In the example in FIG. 3, the cut-off line extends along the two axes 301a and 301b. The orientation of these axes may be identical or different. If their orientation is identical, the two axes may coincide or else run parallel to each other. If, on the other hand, their orientation is different, then the cut-off line includes an angle formed by the intersection of these two axes. The latter case is illustrated in FIG. 3. The cut-off line is preferably horizontal on the left when the direction of traffic flow is on the left and forms an angle of 15° on the right with respect to the horizontal so as to provide a visibility of the near-side, and vice versa when the direction of traffic flow is on the right. Here, the horizontal axis denotes an axis parallel to the horizon of the scene in a plane of the projected image. This horizontal axis may also be defined as being orthogonal to an axis perpendicular to a support plane on which the lighting module is disposed. The cut-off line is almost identical for the front left and right lamps. On the other hand, the cut-off line varies according to whether the direction of traffic flow is on the right or on the left. The cut-off line may also vary according to the country and to their local legislation.

Figure 5:
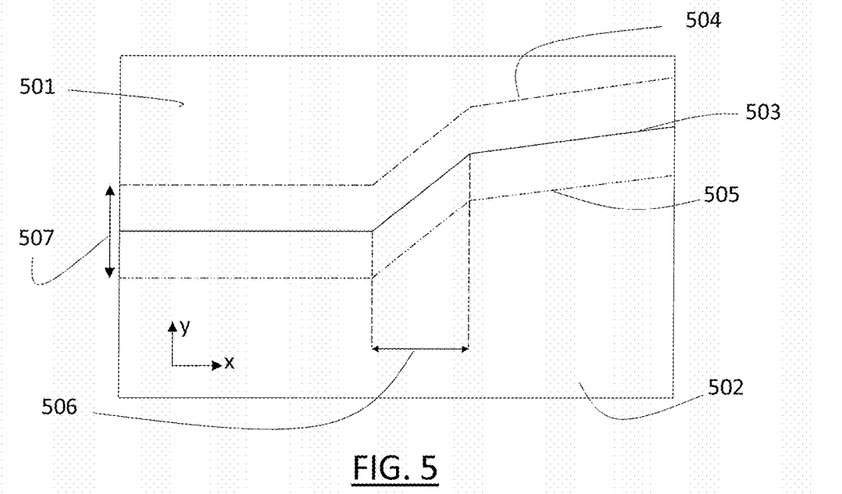
FIG. 5 illustrates schematically one example of the phenomenon of chromatic dispersion localized on the cut-off line of the light beam with a cut-off line illustrated in FIG. 2.

Again in the example in FIG. 3, the cut-off line extends along the two main axes 301a and 301b with a different inclination: the axis 301b is horizontal and the axis 301a forms an angle with the axis 301b. In addition, in the region where the two axes 301a and 301b intersect (304, framed area in FIG. 3) it is observed that the connection between the two axes is made via a third axis or segment 301c. The segment 301c creates a kink on the cut-off line which allows the line to go progressively from the first main axis to the second main axis. The distance separating the two main axes is called the transition rate or else transition angle. FIG. 5 shows an enlargement of the framed area in FIG. 3. The cut-off line 503 extends along two main axes and comprises three segments. The distance 506, separating the two main axes, 504 and 505, is the transition rate or else transition angle.

Thus, when a cut-off line extends along two axes, as in the examples in FIGS. 3 and 5, the cut-off line takes the shape of a broken line composed of three segments, for example. In practice, the transition angle of the cut-off line is fixed by the automotive regulation, and may take a value within the interval between 0.1° and 3°, including boundaries. These values are expressed in degrees. Complex cases may exist, outside the regulations, in which the cut-off line extends along more than two axes. In this case, several transition angles are present at each change of direction of the cut-off line. A transition angle is defined by a gradient, which corresponds to the maximum of the ratio between the derivative of the light intensity and the light intensity along a vertical cross-section; the vertical cross-section may be a cross-section perpendicular to the horizontal axis. The value of this gradient is subject to a regulation which indicates an authorized range of values.

On the projected image of a light beam with a cut-off line, a chromatism of the cut-off line is observed. This means that the transition between the illuminated region and the dark region appears to be coloured. The chromatism of the cut-off line results from the known phenomenon of dispersion.

Figure 4:
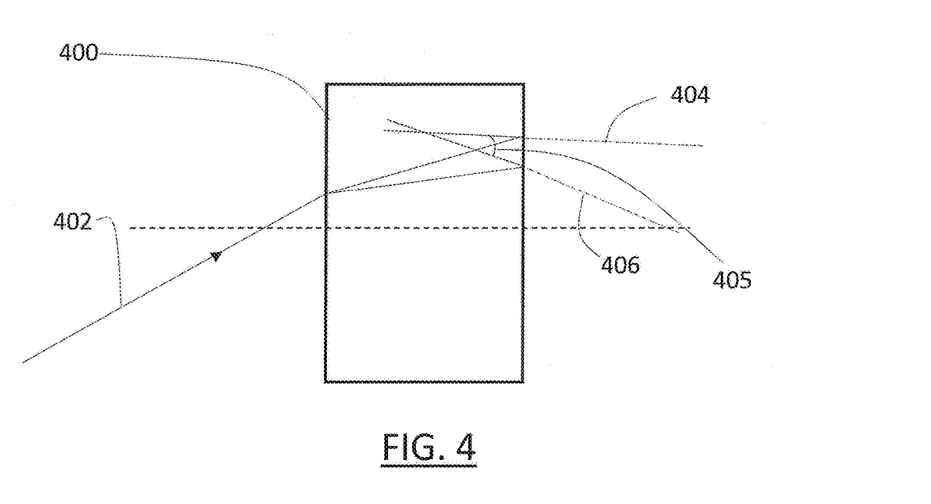
FIG. 4 illustrates schematically one example of the phenomenon of chromatic dispersion.

The dispersion phenomenon is a phenomenon observed for all transparent media, with the exception of a vacuum. This phenomenon is illustrated in FIG. 4 and is now discussed. When a polychromatic light ray 402 passes through a transparent medium 400, other than a vacuum, the wavelengths composing the incident ray propagate at different speeds in the transparent medium. This difference in speed of propagation is observable by a different deviation of the transmitted rays of the wavelengths composing the incident ray, for example the rays 404 and 406. Thus, the dispersion phenomenon may be characterized by the angle 405 formed by the transmitted rays 404, 406 of the two outer wavelengths of the incident ray 402 of polychromatic light. This means that the angle 405 is the angle between the transmitted ray with the shortest wavelength and the transmitted ray with the longest wavelength of the incident polychromatic light. Consequently, for each ray emitted by a polychromatic light source, an angle is observed between the transmitted rays of the two outer wavelengths composing the incident ray at the exit of the transparent medium. The angles observed for all the incident rays coming from the same polychromatic light source are not necessarily equal: for example in the case of a lens, the dispersion angle is close to zero for the incident rays near to the optical axis, and increases as the incident rays get further from the optical axis. In the following, the maximum angle observed at the exit of a transparent medium for all the incident rays coming from the same polychromatic source will be called chromatic dispersion angle. The chromatic dispersion angle is expressed in degrees. In the case of white light, the chromatic dispersion angle 405 is the greatest angle between the transmitted red ray 404 and the transmitted blue ray 405. The dispersion phenomenon depends on the transparent medium in question, in other words on its material and on its shape.

Thus, the phenomenon of dispersion of light passing through a lens depends on the spectrum composing the light, on the material and on the shape of the lenses. Indeed, the dispersion phenomenon necessarily implies a polychromatic incident light: in the automotive field, the light source or sources generally emit a white light. In addition, the chromatic dispersion angle depends on the shape of the lens which may for example be convex, concave, meniscus, and on the material of the lens which may comprise glass, a polymer or a crystal. The dispersion phenomenon is amplified as the incident light rays get close to the periphery of the lens. In practice, it is observed that the further the light ray is from the optical axis, and hence the closer it gets to the periphery of the lens, the more the dispersion phenomenon is visible. For example, the periphery of a lens is the surface 108 shown in FIG. 2.

The chromatism of the cut-off line is shown schematically in FIG. 5, which corresponds to the enlargement of the region 304 in FIG. 3. As previously explained, the cut-off line 503 marks a separation between an illuminated region 501 and a dark region 502. The transition between the dark region 501 and the illuminated region 502 is progressive: a transition region 507 can be seen in which there is a gradual transition from the illuminated region to the dark region. This region is bounded by the images 504 and 505 of the means allowing the cut-off line to be formed, for example a mask. These images 504 and 505 are respectively:

- the projected image of the means allowing the cut-off line to be formed by the rays with the shortest wavelength 504 of the incident light emitted by the light source or sources of the lighting module. In the case of a light source emitting white light, this corresponds to the image of the cut-off line formed by the blue rays. In this case, this image is blue as a consequence.
- the projected image of the means allowing the cut-off line to be formed by the rays with the longest wavelength 505 of the incident light emitted by the light source or sources of the lighting module. In the case of a light source emitting white light, this corresponds to the image of the cut-off line formed by the red rays. In this case, this image is consequently red.

Without the dispersion phenomenon previously discussed, the two images 504 and 506 of the cut-off line would have been superimposed. The image produced by the blue rays is, in general, the most visible, and it is this that causes the other users to see the blue colour in the light emitted by the headlamps.

The chromatism of the cut-off line, caused by the dispersion phenomenon, occurs along all the directions and is therefore observable in several directions. The lighting modules of the prior art either do not correct the chromatism of the cut-off line or correct the chromatism of the cut-off line in an equivalent manner in all these directions.

In order to reduce this phenomenon, the lighting module according to the invention comprises diffractive elements 106 positioned on at least one of the lenses 102. The diffractive elements are patterns, such as transparent marks in relief.

These diffractive elements are positioned on at least one of the lenses of the lighting module, in other words they are disposed on the entry optical interface of at least one lens and/or on its exit optical interface. The positioning of the diffractive elements is carried out in such a manner as to only correct the chromatism in a substantially single direction. Indeed, the chromatism is only visible and a problem for the driver and the other users when it propagates along an axis which is denoted y axis. This y axis is identified in FIG. 5 which shows a horizontal direction x which is parallel to the horizon and a vertical direction y, orthogonal to the horizontal direction x, identified in FIG. 5. As previously explained, the region 507 is the transition region which goes gradually from the illuminated region to the dark region, and it is in this region that the chromatism is visible. The region 507 and the chromatism, which is a nuisance for the driver, therefore extend in this direction y. The reference frame composed of the x axis and of the y axis, which is the axis perpendicular to x in such a manner as to form an orthonormal reference frame with x, is the reference frame linked to the lighting module. This reference frame is used for the following part of the description.

Figure 2:
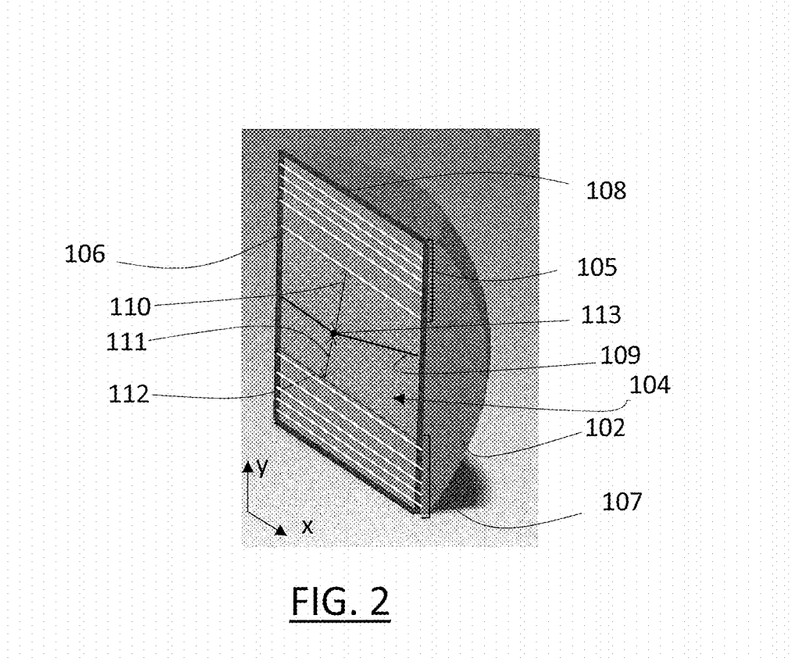
FIG. 2 illustrates one example of a lens with diffraction elements according to the invention.

The lighting module also comprises a central region 104 on the lens or lenses. This central region is lacking any diffractive elements. The central region may extend on either side of and along the projection of the cut-off line on one of the optical interfaces of (one of) the lens(es) of the lighting module according to the invention. The projection of the cut-off line onto one of the optical interfaces of the lens is the image formed by the cut-off line on one of the optical interfaces of the lens. FIG. 2 shows one example of a projection of the cut-off line 109 of the light beam by projection onto the entry optical interface of the lens 102. This example of a central region 104 extends on either side of the projection of the cut-off line 109 on the entry optical interface of the lens 102: this means that the central region may include the projection of the cut-off line, and that the limits of this region may be at (non-zero) distances from this projection. The distances, denoted 110 and 111 in FIG. 2, are the distances between the limits of the central region and the intersection 113 of the projections of the two axes composing the cut-off line. In the complex case where the cut-off line extends along more than two axes, all the projections of the intersections of the axes of the cut-off may be situated at a non-zero distance from the limits of the central region. In the case where the cut-off line runs along coincident or parallel axes, the two axes may be situated at non-zero distances from the limits of the central region. The sum of these two distances 110, 111 forms a height h of the central region. The height is defined with respect to the x axis. This region may also extend along the image of the cut-off line: this means that, as illustrated in FIG. 2, the central region may include the entirety of the projection of the cut-off line onto the optical interface of the lens 102. In the example in FIG. 2, the central region therefore extends along the horizontal direction (x axis) with a distance 112, and along a vertical direction (y axis) according to at least one distance 110, 111. This central region allows the quantity of diffractive elements that need to be placed on the lens 102 to be limited. As a consequence, the intensity at the exit of the lighting module is increased.

The central region is dimensioned in such a manner that the chromatism of the cut-off line is not visible. Indeed, as previously explained, the dispersion phenomenon is small close to the optical axis and increases as the incident rays get closer to the periphery of the lens. Thus, if a central region (comprising the optical axis) is chosen to be sufficiently small, the dispersion phenomenon, and hence the chromatic dispersion angle of this region, is so small that it is not visible by the driver or the other users. In order to increase the light intensity at the exit of the lighting module according to the invention, the central region is preferably dimensioned to be as large as possible, it being understood that the central region is dimensioned such that it allows a chromatic cut-off to be obtained whose chromatism cannot be noticed with the naked eye. In other words, the size of the central region is dimensioned in such a manner that the chromatic dispersion angle of the central region is not visible. In this way, the output intensity is maximized.

Figure 6:
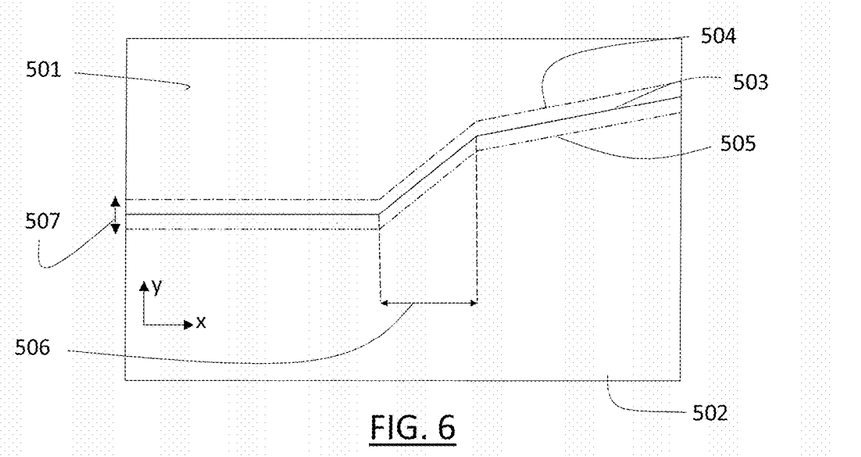
FIG. 6 illustrates schematically one example of the effect of the reduction of the chromatic dispersion angle on the phenomenon of chromatic dispersion which can be seen in FIG. 5.

For this purpose, the central region may advantageously be dimensioned in such a manner that the chromatic dispersion angle of the central region is less than or equal to half of the transition angle of the chromatic cut-off. This is illustrated in FIG. 6 which shows schematically the influence of the variation of the chromatic dispersion angle of the central region; the transition angle is the same as that in FIG. 5. As in FIG. 5, in FIG. 6, the cut-off line 503 is again characterized by a transition angle 506 separating an illuminated region 501 from a dark region 502, and the region 507 around the cut-off line where the chromatism is observable. Without modifying any other parameter, the reduction in the dispersion angle of the central region (in other words the reduction in the size of the central region) allows the size of the coloured region 507, transition from the dark region to the illuminated region, to be reduced. The reduction in the dispersion angle of the central region is obtained by decreasing at least one of the distances 110 and 111 illustrated in FIG. 2, in other words the height of the central region (with respect to the y axis) is reduced. The reduction in the chromatic dispersion angle of the central region allows the visibility of the chromatism of the cut-off line by the drivers and the other users to be reduced. In practice, when the chromatic dispersion angle of the central region is less than or equal to half the transition angle of the cut-off, the chromatism of the projected cut-off is no longer visible. The transition angle of the cut-off 506 may take a value in the range between 0.1° and 3° (degrees) depending on the regulation, including boundaries, and preferably between 0.25° and 0.3°, including boundaries.

Various examples of the positioning of the diffractive elements used in the lighting module are now discussed with reference to FIG. 2 and FIGS. 7-10.

In the example shown in FIG. 2, the lens 102 comprises two optical interfaces; a first optical interface is plane and the second optical interface is convex. Diffractive elements 106 are disposed on the plane optical interface in such a manner that a central region 104 is lacking any diffractive elements. The diffractive elements are therefore disposed within the regions 107 and 105, and bound the central region 104. Thus, the diffractive elements may be positioned on at least one edge surrounding the said central region. The diffractive elements are disposed in such a manner as to be substantially parallel to the cut-off. This means that the inclination of the diffractive elements with respect to the cut-off line is thus less than or equal to 25°, and preferably less than or equal to 18°. For example, when the inclination of the diffractive elements is 18°, then the vertical chromatism is corrected (in other words 100% of the vertical chromatism), and the inclination of the diffractive elements, in this example, allows an additional correction of 25% of the horizontal chromatism. In the case where the cut-off extends along one or more axes, as is for example the case in FIG. 2, the diffractive elements are disposed so as to be substantially parallel with respect to one axis of these axes along which the cut-off extends. For example, when the cut-off line comprises a horizontal segment (along the x axis in FIG. 2), the diffractive elements are disposed substantially parallel to this horizontal axis. Such a disposition of the diffractive elements allows a correction of the chromatism of the projected cut-off in the aforementioned vertical direction (y axis in FIG. 2). This only allows the chromatism that affects the other users and the driver to be corrected: this correction is thus appropriate for the lighting devices of motor vehicles. Moreover, since the central region extends along the cut-off, a larger surface area of the lens does not comprise any diffractive elements, which increases the light intensity at the exit of the lens and facilitates the fabrication.

Figure 7:
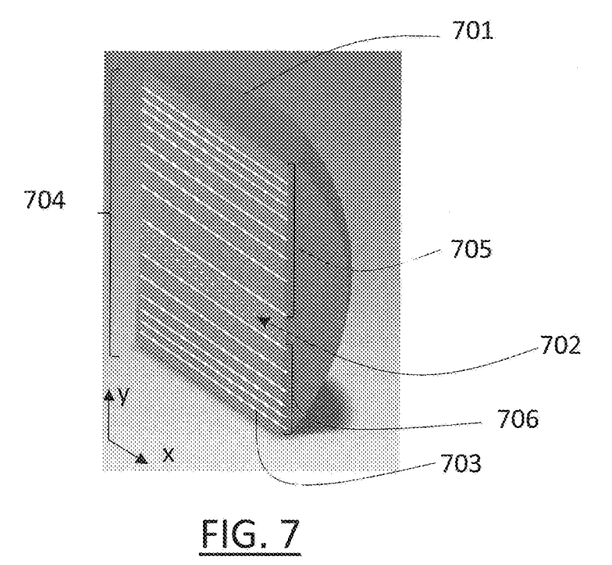
FIG. 7 illustrates one example of a diffraction pattern according to the invention.

In the example shown in FIG. 7, the lens 701 carries diffractive elements arranged in such a manner as to form lines of diffractive elements 703. The lines of diffractive elements are disposed within the regions 705 and 706, which bound the central region 702 with no diffractive elements. The central region 702 is shown in FIG. 2 by the white dots. FIG. 7 also illustrates the possibility of the surface area occupied by the central region 702 being of reduced size with respect to the optimum size of the central region, such as for example that shown in FIG. 2. A line or line of diffractive elements comprises several diffractive elements which are aligned with respect to one another. These lines are preferably rectilinear, in other words they have a form close to a part of a straight line. They are also substantially parallel to one another: this means that the inclination of the lines of diffractive elements with respect to one another is less than 18°. The lines of diffractive elements may also have a curved shape, or else take the form of a wave that may resemble a low-amplitude sinusoidal shape. In any case, when the lines are not straight, their shape must allow the chromatism of the cut-off in the vertical direction (denoted x in FIG. 7) to be corrected. The disposition of these diffractive elements is called a diffraction pattern 704. The diffraction pattern is chosen according to the dispersive power of the lenses, and hence depends on their shapes and their materials. In the case of the configuration shown in FIG. 7, the diffraction pattern allows the chromatism of the projected cut-off to be corrected in the aforementioned vertical direction (the x axis). This correction is thus appropriate for the chromatism of the lighting devices of motor vehicles, in other words it is designed to correct the chromatism in the vertical axis of the beams with a horizontal cut-off line.

Figure 9:
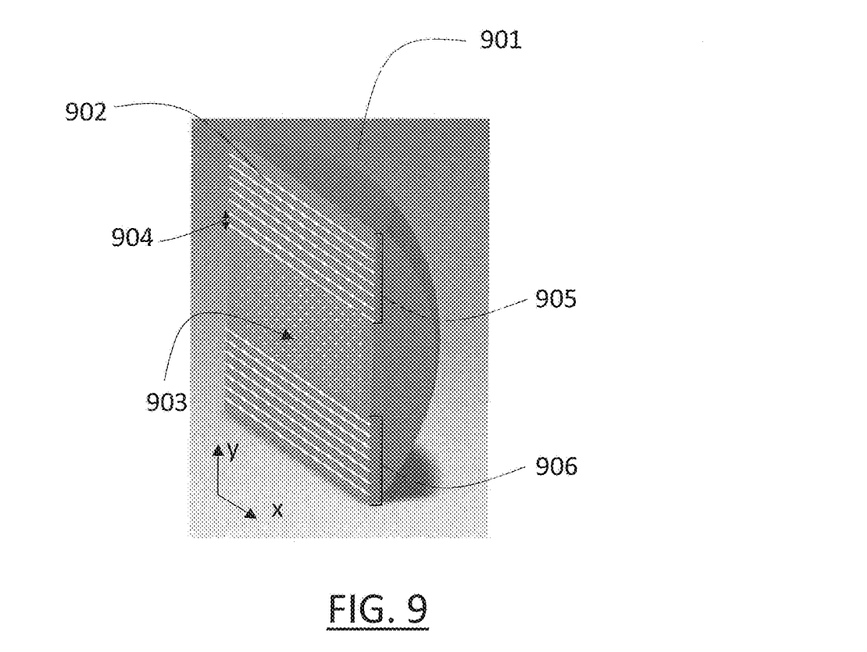
FIG. 9 illustrates another example of a diffraction pattern according to the invention.

The correction power of the chromatism of the cut-off line by a diffraction pattern depends on the intervals separating the shapes of the diffraction pattern. The diffraction efficiency depends on the shape of the diffraction pattern, and also on the height of the diffractive elements. The diffraction efficiency is a value which represents the extent of the energy of the diffracted light that can be obtained with respect to an energy of incident light. In other words, a low efficiency of the diffraction corresponds to a loss and a scattering of the light from the light source of the lighting module. The height of the diffractive elements is understood to refer to the thickness of these elements along a z axis, perpendicular to the x and y axes. As previously explained, the diffractive elements are arranged so as to correct the chromatism of the cut-off line along the vertical axis. The interval, also referred to as the pitch, separating the shapes of the diffractive elements is the distance separating two successive shapes of diffractive elements. FIG. 9 illustrates the use of lines as a diffraction pattern: the diffractive elements are aligned and thus form lines of diffractive elements. Lines 902 of diffractive elements are disposed on an optical interface of the lens 901, more precisely on the regions 905 and 906 surrounding the central region 903 lacking any diffractive elements. The distance between the successive lines of diffractive elements 904 is, in this example, the same for all the lines of diffractive elements. It is possible to fix the pitch 904 so that the correction power of the diffraction pattern is adapted to the chromatic dispersion angle of the regions.

Generally speaking, the shorter the distance between the lines of diffractive elements, in other words the smaller the pitch, the more the correction power will be adapted to the large dispersion angles. As previously mentioned, the dispersion phenomenon is small close to the optical axis and becomes accentuated at the edges of the lens. In the regions located near to the edges of the lens, the chromatic dispersion angle of these regions is therefore greater than that of the central region: it is thus possible to make the distance between two successive lines of diffractive elements vary in such a manner that the pitch corrects the chromatic dispersion angle of the region bounded by the successive lines of diffractive elements. This example is illustrated in FIG. 8.

Figure 8:
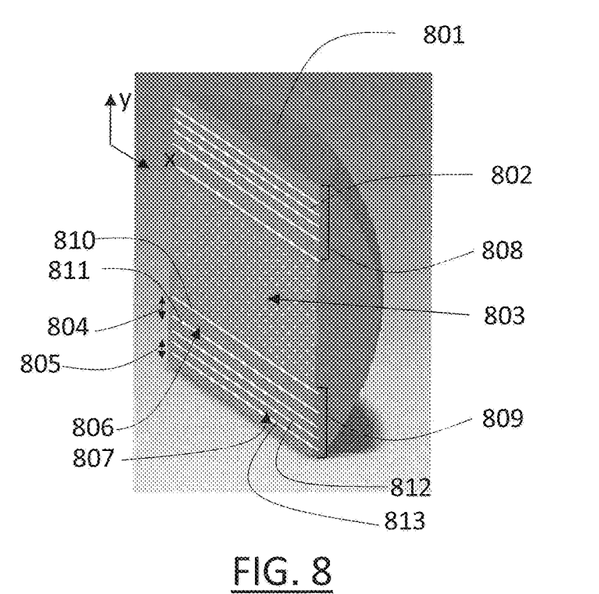
FIG. 8 illustrates another example of a diffraction pattern according to the invention.

FIG. 8 illustrates one example in which the distances separating two successive lines of diffractive elements vary. The lines of diffractive elements 802 are disposed on an optical interface of the lens 801 in such a manner that the central region 803 is lacking any diffractive elements. The distance 804 is one pitch step away from the central region and the distance 805 is one pitch step away from the edges of the lens. A region 806 is bounded by the successive lines of diffractive elements 810 and 811 which are separated by the pitch step 804. This region 806 has a chromatic dispersion angle which is lower than that of the region 807 bounded by the successive lines of diffractive elements 812 and 813 separated by one pitch step 805. The proximity of the region 807 to the edges of of the lens cause this difference. It is indeed around the edges of the lens that the phenomenon of chromatic dispersion is accentuated. The pitch step calculated for the correction of the chromatic dispersion angle of the region 806 is therefore smaller than the pitch step calculated for the correction of the chromatic dispersion angle of the region 807. The pitch step 804 is larger than the pitch step 805: this therefore allows the pitch step to be adapted to the correction of the dispersion phenomenon in the region 806 between the lines 810 and 811 which is smaller than in the region 807 bounded by the lines 812 and 813. Thus, in this example, the pitch step between the successive lines of diffractive elements varies as a function of the chromatic dispersion angles associated with the regions bounded by these lines. The variation of the distance between the successive lines of elements increases as the lines of diffractive elements get close to the central region. The increase in the distance between the lines of elements allows the diffraction efficiency to be increased, while at the same time providing a suitable correction for the dispersion phenomenon. The variation of the pitch step may be the same in the regions 808 and 809 where the lines of diffractive elements are disposed and which bound the central region 803.

Figure 10:
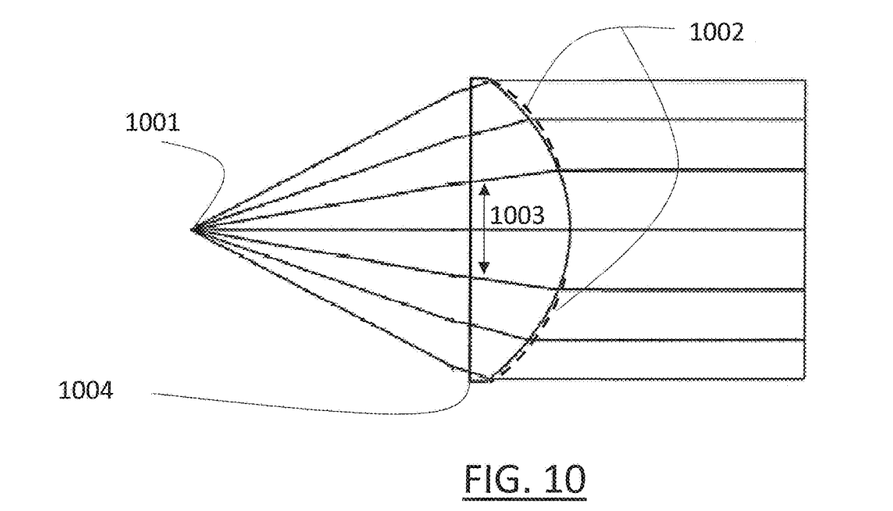
FIG. 10 illustrates one example of a lighting module according to the invention comprising diffractive elements on the exit optical interface of the lens.
Figure 11:
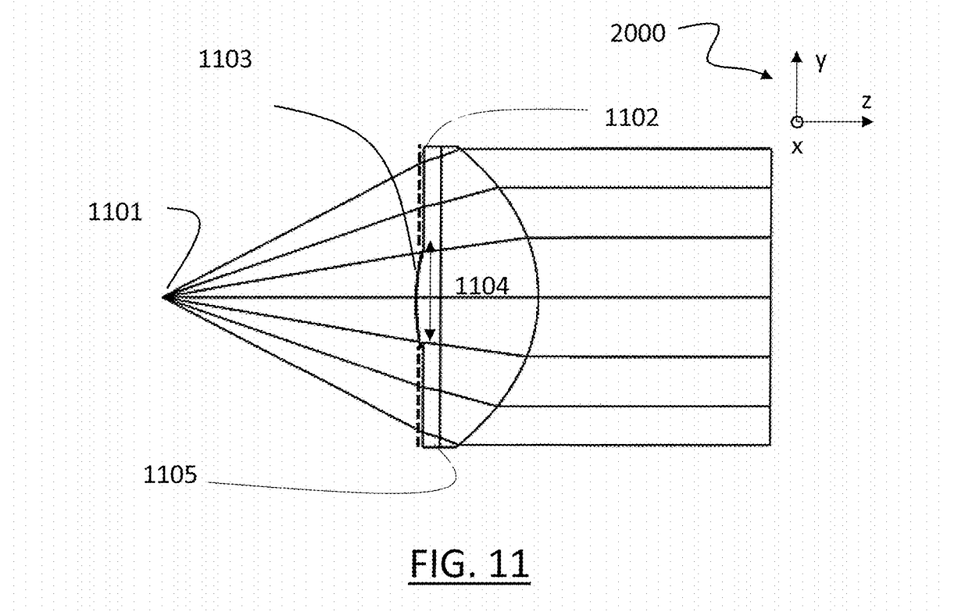
FIG. 11 illustrates one example of a lighting module according to the invention comprising diffractive elements on the entry optical interface of the lens.
Figure 12:
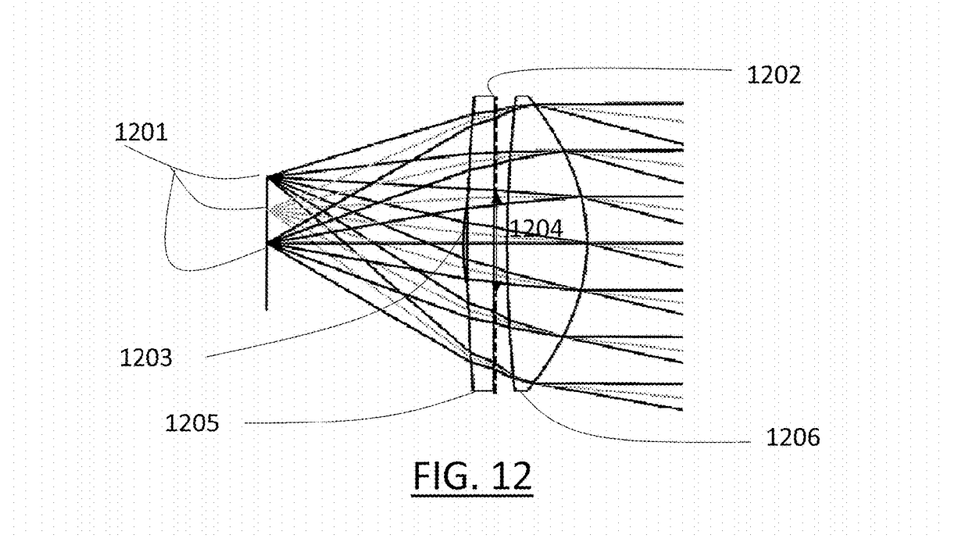
FIG. 12 illustrates one example of a lighting module according to the invention.

FIGS. 10 to 12 illustrate examples in which the diffractive elements 1002, 1102 and 1202 may be disposed on the entry optical interface or on the exit optical interface of the lens or lenses of the lighting module.

FIG. 10 illustrates one example of a lighting module according to the invention. It is composed of a light source 1001 and of a lens 1004 which comprises a plane entry optical interface and a convex exit optical interface. Diffractive elements 1002 are disposed in the direction of the edges of the convex exit optical interface, in other words there is a central region 1003 lacking any diffractive elements. This embodiment allows the losses of intensity associated with the diffractive elements to be reduced. Thus, the disposition on the convex exit optical interface of a lens 1004 allows the light intensity at the exit of the lighting module to be increased. Notably, it is advantageous to have the diffractive elements on the exit optical interface because this allows the intensity of light at the exit of the lens to be maximized.

The exemplary lighting module in FIG. 11 is composed of a light source 1101 and of a convex lens 1105 with a plane entry optical interface, on which diffractive elements 1102 are disposed on either side of the central region 1104 which does not have any diffractive elements. In this example, the central region 1104 without diffractive elements has a cylindrical optical power 1103. The cylindrical optical power denotes the optical power of a cylindrical lens. A cylindrical lens has no optical power in the direction X and a non-zero optical power in the direction Y of the reference frame 2000. For this purpose, the optical interface is modified in the central region so as to obtain an optical power similar to an optical power of a cylindrical lens. As illustrated in FIG. 11, a curvature of the optical interface may be added to the central region. This cylindrical optical power given by 1103 allows the difference in deviation of the rays passing through the central region with respect to those passing through the regions covered by diffractive elements to be reduced. This is because the diffractive elements disposed on the lens or the lenses of the module deviate the path of the transmitted rays with respect to the transmitted rays in the absence of the diffraction.

The addition of optical power via the modification of the entry optical interface of the lens in order to reduce the difference in deviation introduced by the diffractive elements is compatible with a disposition of the diffractive elements on the entry or exit optical interface of one or more lenses of the lighting module. For example, FIG. 12 illustrates a configuration in which the lighting module comprises three light sources 1201 and an optical system comprising two lenses 1205 and 1206. The diffractive elements 1202 are disposed on the exit optical interface of the first lens 1205, in such a manner that a central region 1204 is lacking diffractive elements. A convergent lens 1203 is disposed on the entry optical interface of the lens 1204 on which the diffractive elements 1202 are disposed. The convergent lens 1203 is mounted against the lens 1204 in order to ensure the continuity of the deviation of the rays in the central region 1204 with no diffractive elements. The lens 1206 receives the light rays from the lens 1205 and forms the light beam emitted by the lighting module.

The diffractive elements may be formed on a film by a lamination process. The film is a layer of a transparent solid material. The film may be a transparent plastic film. A transparent material means any material whose light transmission is higher than 60%. The diffractive elements, which may be marks in relief, may be formed by lamination, in other words by the plastic deformation of the film. Thus, several diffractive elements are formed on a portion of film, according to the various detailed dispositions in the embodiments previously described. The film, comprising one of the diffraction patterns discussed, is placed onto one of the lenses of the lighting module. In other words, the film is applied onto the surface of the lens, in such a manner as to be fixed to the optical interface of the lens. This attachment may be done by means of an adhesive, for example a polymerizable adhesive which polymerizes following a brief exposure to a UV light. The film may be a self-adhesive film. In the same module, it is possible for such a film, comprising identical or similar diffraction patterns, to be applied to several lenses. The lamination process is particularly advantageous for fabricating lines of diffractive elements. Notably, when the pattern comprises lines, the fabrication of a film such as previously described is facilitated, as compared for example with circular diffraction patterns.

The lighting modules described are integrated into lighting devices that can be used as low-beam or high-beam headlamps or as fog beam lamps. Such lighting devices may incorporate one or more versions of the lighting module, in other words designed according to various embodiments.

The invention claimed is:

1. A lighting module for a motor vehicle, the lighting module comprising:
   at least one lighting engine configured to form a light beam with a cut-off line, the cut-off line running along one or more axes; and
   at least one lens designed to project the light beam with the cut-off line, the at least one lens comprising diffractive elements to correct all or part of chromatism of the at least one lens, and comprising a central region which is lacking the diffractive elements, wherein
   the diffractive elements are substantially parallel to the cut-off line.

2. The lighting module according to claim 1, wherein the central region extends on either side of and along a projection of the cut-off line on the at least one lens.

3. The lighting module according to claim 2, wherein the diffractive elements are positioned on at least one edge surrounding the central region of the at least one lens.

4. The lighting module according to claim 2, wherein the diffractive elements are substantially parallel to the cut-off line.

5. The lighting module according to claim 1, wherein the diffractive elements are positioned on at least one edge surrounding the central region of the at least one lens.

6. The lighting module according to claim 2, wherein the central region extends such that chromatic dispersion angle of light emitted by the lighting engine at an exit of the central region is less than or equal to half of an angle of a transition of the cut-off line.

7. The lighting module according to claim 5, wherein the central region extends such that chromatic dispersion angle of light emitted by the lighting engine at an exit of the central region is less than or equal to half of an angle of a transition of the cut-off line.

8. The lighting module according to claim 6, wherein the angle of the transition of the cut-off line is in a range between 0.1° and 3° including boundaries.

9. The lighting module according to claim 6, wherein the angle of the transition of the cut-off line is in a range between 0.25° and 0.3° including boundaries.

10. The lighting module according to claim 1, wherein the diffractive elements are positioned on an entry optical interface or an exit optical interface of the at least one lens.

11. The lighting module according to claim 1, wherein a film comprises the diffractive elements and is placed onto the at least one lens.

12. The lighting module according to claim 11, wherein the film is obtained by a lamination process.

13. The lighting module according to claim 1, wherein the one or more light sources are electroluminescent sources.

14. A lighting device comprising at least one lighting module according to claim 1.

15. The lighting device according to claim 14, executing a function chosen from amongst:
- a low-beam function;
- a high-beam function;
- a fog beam function.

16. A lighting module for a motor vehicle, the lighting module comprising:
- at least one lighting engine configured to form a light beam with a cut-off line, the cut-off line running along one or more axes; and
- at least one lens designed to project the light beam with the cut-off line, the at least one lens comprising diffractive elements to correct all or part of chromatism of the at least one lens, and comprising a central region which is lacking the diffractive elements, wherein
- the diffractive elements are arranged so as to form lines of diffractive elements, the lines of diffractive elements being substantially rectilinear and parallel to one another.

17. The lighting module according to claim 16, wherein distances separating two successive lines of diffractive elements are identical.

18. Lighting The lighting module according to claim 17, wherein a distance between two successive lines of diffractive elements is calculated as a function of a material and of a shape of the at least one lens.

19. The lighting module according to claim 16, wherein a distance between two successive lines of diffractive elements depends on a position of the two successive lines of diffractive elements with respect to the central region.

20. A lighting module for a motor vehicle, the lighting module comprising:
- at least one lighting engine configured to form a light beam with a cut-off line, the cut-off line running along one or more axes; and
- at least one lens designed to project the light beam with the cut-off line, the at least one lens comprising diffractive elements to correct all or part of chromatism of the at least one lens, and comprising a central region which is lacking the diffractive elements, wherein
- the central region has a cylindrical optical power.

* * * * *